G. W. THOMPSON.
VALVE.
APPLICATION FILED JULY 18, 1919.
1,339,798.
Patented May 11, 1920.
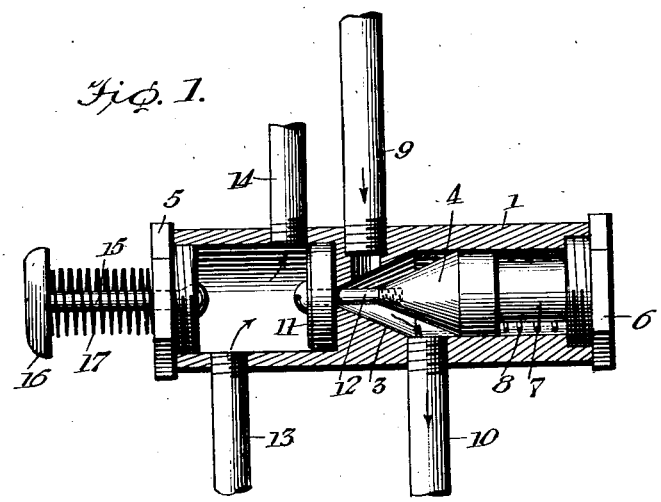
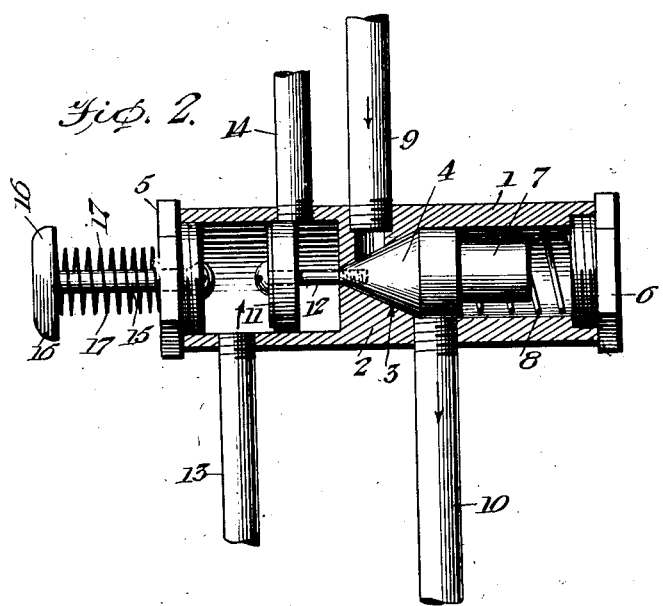
WITNESSES
INVENTOR
Geo. W. Thompson,
BY
ATTORNEYS

UNITED STATES PATENT OFFICE.

GEORGE WILLIAM THOMPSON, OF CHEBOYGAN, MICHIGAN.

VALVE.

1,339,798.

Specification of Letters Patent.

Patented May 11, 1920.

Application filed July 18, 1919. Serial No. 311,712.

*To all whom it may concern:*

Be it known that I, GEORGE W. THOMPSON, a citizen of the United States, and a resident of Cheboygan, in the county of Cheboygan and State of Michigan, have invented certain new and useful Improvements in Valves, of which the following is a specification.

My invention is an improvement in valves, and has for its object to provide a valve adapted to be interposed in the fuel supply line of a motor vehicle and in the oil line, for controlling the flow of the fuel to the carbureter, and having means normally operative to cut off the fuel supply, but controlled to inoperative position by the flow of oil through the valve, the arrangement being such that when the oil does not flow the motor will be stopped.

In the drawings:

Figures 1 and 2 are sectional views of the improved valve, showing the parts in different position.

In the present embodiment of the invention, a suitable casing 1 is provided, having a transverse partition 2 intermediate its ends, which is of considerable thickness, as shown, and has a central opening 3 of tapering or conical form, and forming a seat, with which coöperates a valve 4. The ends of the casing are closed by threaded plugs 5 and 6, and the valve 4 has a reduced portion 7 adjacent to the plug 6, about which engages a coil spring 8, the said spring being arranged between the valve and the plug and normally acting to seat the valve.

The ends 9 and 10 of the fuel supply pipe are engaged with threaded openings in the casing, between the partition 2 and the plug 6. The inlet end 9 of the fuel supply pipe opens at the tapered portion of the seat, while the outlet end 10 of the supply pipe opens between the tapered portion of the seat and the plug 6.

In that portion of the casing between the partition 2 and the plug 5 a piston or plunger 11 is arranged, the said piston or plunger being connected to the valve 4 by a stem 12. The ends 13 and 14 of the oil supply pipe connect with that portion of the casing between the partition 2 and the plug 5. The inlet end of the said line opens near the plug 5, while the outlet end 14 opens near the partition 2, and the stem 12 is of such length that when the valve 4 is closed on its seat 3 the piston or plunger 11 will be between the inlet and outlet ends of the oil supply, as shown in Fig. 2.

The operation of the device is as follows: So long as oil flows through the line 13—14, the valve will be held in the position of Fig. 1, due to the pressure upon the plunger 11. As soon, however, as the flow of oil stops the pressure relaxes in the compartment between the partition 2 and the plug 5, and the spring 8 seats the valve 4 as shown in Fig. 2, cutting off the fuel supply and stopping the engine. Manually controlled means is provided for opening the valve 4. The said means consists of a rod 15 which is mounted to slide through the plug 5 and has a head 16 at its outer end. The inner end of the rod is headed, as shown, to engage the end of the stem 12, and a coil spring 17 is arranged between the head 16 and the plug 5, the spring acting normally to hold the rod in operative position. When it is desired to release the valve 4, the rod is pressed inwardly, to move the valve into the position of Fig. 1.

It will be evident that whenever the oil flow stops for any reason the supply of fuel will be immediately cut off from the engine.

I claim:

1. In an internal combustion engine, a casing having a transverse partition dividing the casing into two compartments, said partition having a port, a valve in one of the compartments coöperating with the port, a spring normally acting to seat the valve, the said compartment being interposed in the fuel supply line of the engine, and the other compartment being interposed in the oil supply line of the engine, said valve when seated closing the fuel line, and a plunger in the last named compartment connected with the valve and controlled by the pressure of the oil in the compartment for holding the valve open.

2. In an internal combustion engine, a casing having a plurality of compartments, one of said compartments being adapted for interposition in the fuel supply line of an engine, and the other in the oil supply line, a valve in the first named compartment for controlling the communication through the fuel supply line, a spring normally acting to seat the valve, said valve being controlled to open position by the pressure in the other compartment, and manually controlled means in the said other compartment for opening the valve.

3. In an internal combustion engine, a casing having a plurality of compartments, one of said compartments being adapted for interposition in the fuel supply line of an engine and the other in the oil supply line, and a valve in the first named compartment for controlling the communication through the fuel supply line.

4. In an internal combustion engine, a casing having a plurality of compartments, one of said compartments being adapted for interposition in the fuel supply line of an engine and the other in the oil supply line, and a normally operative valve in the first compartment for closing the communication through the fuel supply line, and controlled by the pressure in the other compartment to open position.

GEORGE WILLIAM THOMPSON.